(12) United States Patent
Le et al.

(10) Patent No.: US 8,749,926 B1
(45) Date of Patent: Jun. 10, 2014

(54) SCISSOR MAGNETIC READ HEAD WITH WRAP-AROUND MAGNETIC SHIELD

(71) Applicant: HGST Netherlands B.V., Amsterdam (NL)

(72) Inventors: Quang Le, San Jose, CA (US); Simon H. Liao, Fremont, CA (US); Guangli Liu, Pleasanton, CA (US); Stefan Maat, San Jose, CA (US); Xiaozhong Dang, Fremont, CA (US); David J. Seagle, Morgan Hill, CA (US); Petrus A. Van Der Heijden, Cupertino, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/691,525

(22) Filed: Nov. 30, 2012

(51) Int. Cl.
*G11B 5/39* (2006.01)
(52) U.S. Cl.
USPC ....................... 360/324.12; 360/319
(58) Field of Classification Search
CPC .............. G11B 5/3912; G11B 2005/3996; G11B 5/3932; G11B 5/11; G11B 5/39
USPC ..................... 360/324–324.12, 319
See application file for complete search history.

(56) References Cited

U.S. PATENT DOCUMENTS

| 5,818,685 | A * | 10/1998 | Thayamballi et al. | 360/324 |
|---|---|---|---|---|
| 6,667,862 | B2 * | 12/2003 | Zhu | 360/324.12 |
| 6,700,760 | B1 | 3/2004 | Mao | |
| 7,333,304 | B2 | 2/2008 | Gill et al. | |
| 7,804,662 | B2 | 9/2010 | Chen et al. | |
| 8,089,734 | B2 * | 1/2012 | Miyauchi et al. | 360/319 |
| 2007/0253117 | A1 | 11/2007 | Takei et al. | |
| 2009/0135529 | A1 * | 5/2009 | Shimazawa et al. | 360/319 |
| 2009/0262465 | A1 | 10/2009 | Hatatani et al. | |
| 2009/0273864 | A1 * | 11/2009 | Machita et al. | 360/319 |
| 2010/0079917 | A1 * | 4/2010 | Miyauchi et al. | 360/319 |
| 2010/0097729 | A1 | 4/2010 | Gill et al. | |
| 2011/0026169 | A1 | 2/2011 | Gill et al. | |
| 2011/0051291 | A1 * | 3/2011 | Miyauchi et al. | 360/245.3 |
| 2011/0228428 | A1 | 9/2011 | Dimitrov et al. | |
| 2011/0279923 | A1 * | 11/2011 | Miyauchi et al. | 360/75 |
| 2011/0317313 | A1 * | 12/2011 | Miyauchi et al. | 360/245.3 |
| 2012/0087045 | A1 * | 4/2012 | Yanagisawa et al. | 360/294 |
| 2012/0087046 | A1 * | 4/2012 | Yanagisawa et al. | 360/294 |
| 2012/0250189 | A1 * | 10/2012 | Degawa et al. | 360/235.4 |

OTHER PUBLICATIONS

Haginoya et al., "Side-Shielded Tunneling Magnetoresistive Read Head for High-Density Recording," 2004 IEEE, IEEE Transactions on Magnetics, vol. 40, No. 4, Jul. 2004, pp. 2221-2223.

(Continued)

*Primary Examiner* — Will J Klimowicz
(74) *Attorney, Agent, or Firm* — Zilka-Kotab, PC (57) ABSTRACT

A magnetic scissor type magnetic read head having magnetic side shielding for reduced effective track width and having side biasing for improved stability. The read head includes first and magnetic side shields that each include first and second magnetic layers and an anti-parallel exchange coupling layer sandwiched there-between. The magnetic layers of the side shields are anti-parallel coupled with one another such that one of the magnetic layers has its magnetization oriented in a first direction parallel with the air bearing surface and the second magnetic layer has its magnetization oriented in a second direction that is opposite to the first direction and also parallel with the air bearing surface. These magnetizations of the first and second magnetic layers provide a bias field that stabilizes the magnetization of the free magnetic layers of the sensor stack to prevent flipping of the magnetizations of these layers.

23 Claims, 11 Drawing Sheets

(56) References Cited

OTHER PUBLICATIONS

Zhu et al., "Impact of Head Structure on Stability of Permanent Magnet Biased Magnetoresistive Heads," Digest of the Magnetic Recording Heads, Magnetic Recording Conference 1995, Jul. 10-12, 1995, pp. 1-2.

Ashar, K., "MR Heads," Magnetic Disk Drive Technology:Heads, Media, Channel, Interfaces, and Integration, 1997, pp. 121-162.

* cited by examiner

SCISSOR MAGNETIC READ HEAD WITH WRAP-AROUND MAGNETIC SHIELD

FIELD OF THE INVENTION

The present invention relates to magnetic data recording and more particularly to a scissor style magnetic read sensor with a wrap around shield for reduced track width and reduced gap thickness.

BACKGROUND OF THE INVENTION

The heart of a computer is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating, but when the disk rotates air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

The write head includes at least one coil, a write pole and one or more return poles. When a current flows through the coil, a resulting magnetic field causes a magnetic flux to flow through the write pole, which results in a magnetic write field emitting from the tip of the write pole. This magnetic field is sufficiently strong that it locally magnetizes a portion of the adjacent magnetic disk, thereby recording a bit of data. The write field, then, travels through a magnetically soft underlayer of the magnetic medium to return to the return pole of the write head.

A magnetoresistive sensor such as a Giant Magnetoresistive (GMR) sensor or a Tunnel Junction Magnetoresivive (TMR) sensor can be employed to read a magnetic signal from the magnetic media. The magnetoresistive sensor has an electrical resistance that changes in response to an external magnetic field. This change in electrical resistance can be detected by processing circuitry in order to read magnetic data from the adjacent magnetic media.

As the need for data density increases there is an ever present need to decrease the track width of the system as well as well as the bit length. With regard to the magnetic head, this means reducing the effective track width of the read head and reducing the magnetic spacing of the read head. However, physical limitations as well as manufacturing limitations have constrained the amount by which the track width and gap thickness of the magnetic read head can be reduced. Therefore, there remains a need for a magnetic read head that can provide such reduced track width and gap thickness and for a manufacturing process capable of producing such a system. In addition, there is a need for a magnetic sensor to be reliable and robust in a variety of operating environments.

SUMMARY OF THE INVENTION

The present invention provides a magnetic read sensor that includes a sensor stack having first and second magnetic free layers that are anti-parallel coupled across a non-magnetic layer sandwiched there-between. A magnetic side shield structure is formed at a side of the sensor stack, a non-magnetic, electrically insulating layer separates the magnetic side shield structure from the sensor stack. The magnetic side shield structure further includes first and second magnetic layers and an exchange coupling layer sandwiched between the first and second magnetic layers. The magnetic layers are anti-parallel coupled with one another across the exchange coupling layer. The first magnetic layer is laterally aligned with the first magnetic free layer of the sensor stack and provides a magnetic bias field in a first direction parallel with an air bearing surface, and the second magnetic layer is laterally aligned with the second magnetic free layer of the sensor stack and provides a magnetic bias field in a second direction that is opposite to the first direction.

The magnetic side shield advantageously provides magnetic side shielding that reduces the effective track-width for improved track density and data density. In addition, the side shield provides a magnetic biasing that biases each of the free layers of the sensor stack in opposite directions so as to prevent flipping of the magnetizations of the magnetic free layers. This greatly improves the stability of the sensor.

The sensor can be a scissor type sensor with the two magnetic free layers being anti-parallel coupled with one another, and with a bias structure at the back edge of the sensor stack (opposite the air bearing surface) that cants the magnetizations of the free layer away from being anti-parallel, making them orthogonal to one another. In the presence of a magnetic field the relative angle of the magnetizations of the two free layers changes, resulting in a measurable change in electrical resistance.

These and other features and advantages of the invention will be apparent upon reading of the following detailed description of preferred embodiments taken in conjunction with the figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE PREFERRED EMBODIMENTS

The following description is of the best embodiments presently contemplated for carrying out this invention. This description is made for the purpose of illustrating the general principles of this invention and is not meant to limit the inventive concepts claimed herein.

Figure 1:
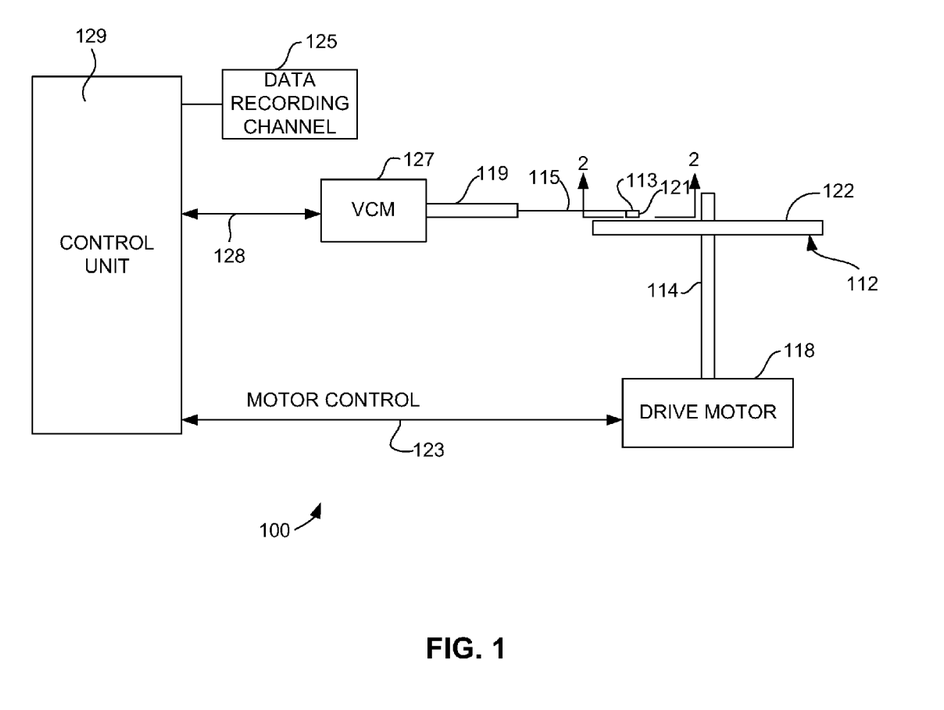
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 can access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
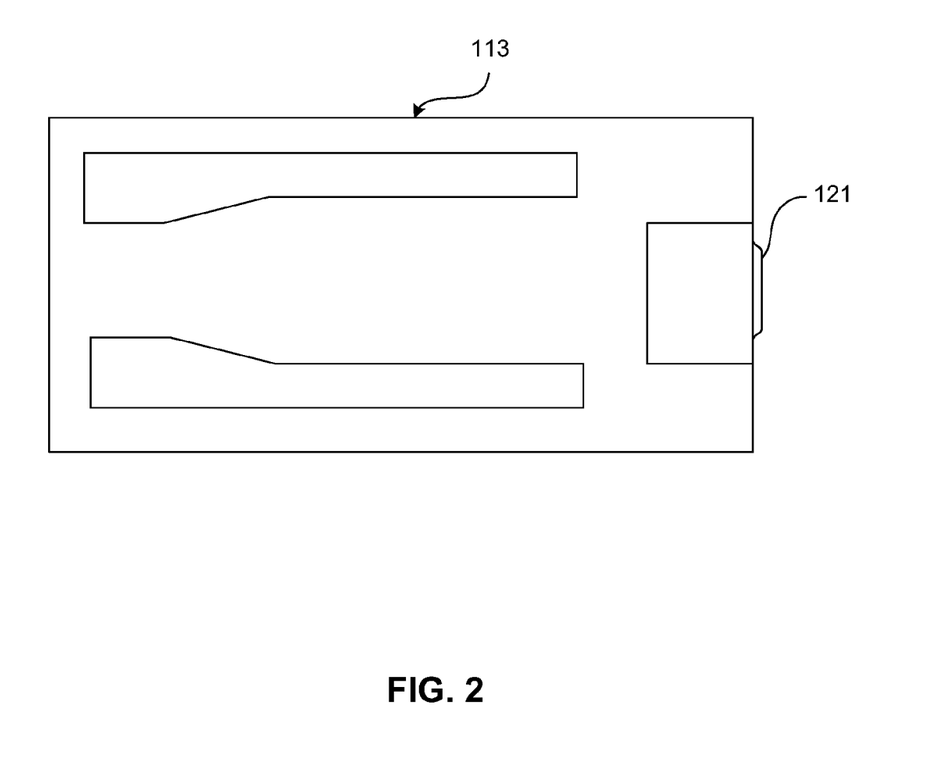
FIG. 2 is an ABS view of a slider illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system and the accompanying illustration of FIG. 1 are for representation purposes only. It should be apparent that disk storage systems may contain a large number of disks and actuators, and each actuator may support a number of sliders.

Figure 3:
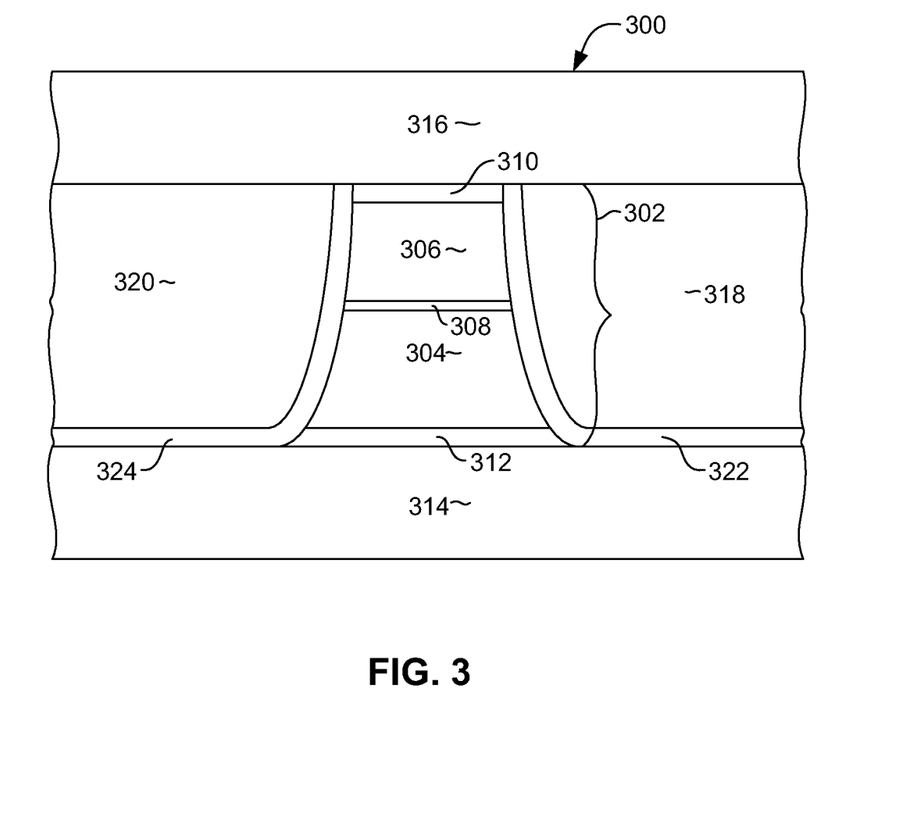
FIG. 3 is an air bearing surface view of a prior art magnetic read sensor.

FIG. 3 shows a view of a magnetic read head 300 as viewed from the air bearing surface. The read head 300 is a scissor type magnetoresistive sensor having a sensor stack 302 that includes first and second free layers 304, 306 that are antiparallel coupled across a non-magnetic layer 308 that can be a non-magnetic, electrically insulating barrier layer such as MgOx or an electrically conductive spacer layer such as AgSn. A capping layer structure 310 can be provided at the top of the sensor stack 302 to protect the layers of the sensor stack. The sensor stack 302 can also include a seed layer structure 312 at its bottom to promote a desired grain growth in the above formed layers.

The first and second magnetic layers 304, 306 can be constructed of multiple layers of magnetic material. For example, the first magnetic layer 304 can be constructed of: a layer of Ni—Fe; a layer of Co—Hf deposited over the layer of Ni—Fe; a layer of Co—Fe—B deposited over the layer of Co—Hf; and a layer of Co—Fe deposited over the layer of Co—Fe—B. The second magnetic layer 306 can be constructed of: a layer of Co—Fe; a layer of Co—Fe—B deposited over the layer of Co—Fe; a layer of Co—Hf deposited over the layer of Co—Fe—B; and a layer of Ni—Fe deposited over the layer of Co—Hf. The capping layer structure 310 can also be constructed as a multi-layer structure and can include first and second layers of Ru with a layer of Ta sandwiched there-between. The seed layer structure 312 can include a layer of Ta and a layer of Ru formed over the layer of Ta.

The sensor stack 302 is sandwiched between leading and trailing magnetic shields 314, 316, each of which can be constructed of a magnetic material such as Ni—Fe, of a composition having a high magnetic saturation constant (high Bsat) to provide effective magnetic shielding. In addition, the structure 300 includes first and second magnetic side shields 318, 320 which are also constructed of a soft magnetic material such as Ni—Fe, and which can be constructed to have a high or low Bsat. The side shields 318 and 320 are separated from the sensor stack 302 by non-magnetic, electrically insulation layers 322, 324 which can be a material such as alumina. The insulation layers 322, 324 prevent electrical sense current from being shunted through the side shields 318, 320.

It can be seen that the side shields, 318, 320 are functionally magnetically connected with the trailing shield 316 so that together the side shields 318, 320 and trailing shield 316 form a wrap-around magnetic shield. The presence of the side shields improves track-width definition and helps to reduce the track-width of the sensor 300.

Figure 4:
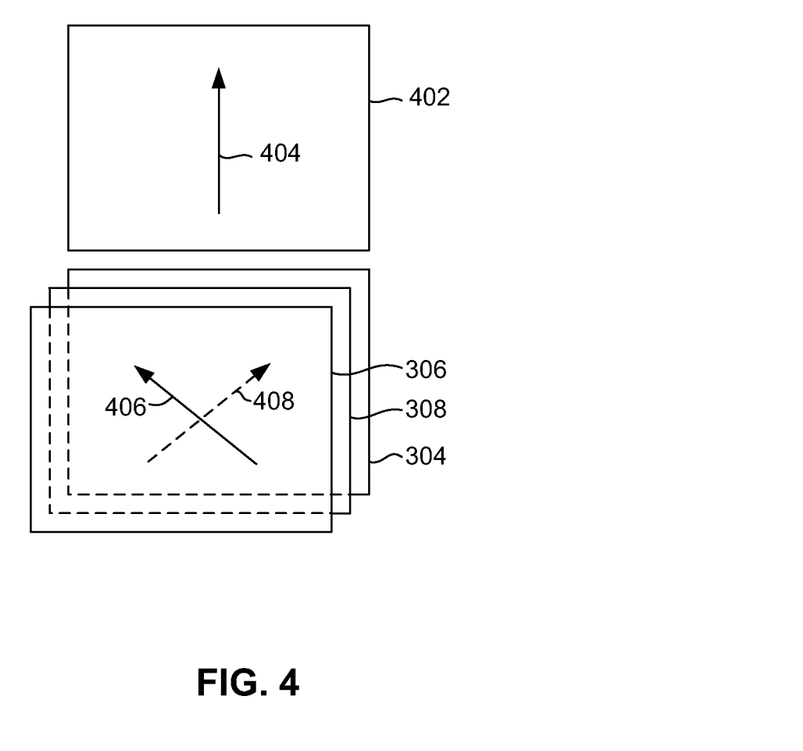
FIG. 4 is a top down, exploded, schematic view of a portion of the read element of FIG. 3.

FIG. 4 shows an exploded, top-down view of the magnetic layers 304, 306 with the non-magnetic layer 308 there-between. The presence of the non-magnetic layer 308 between the first and second magnetic layers 304, 306 causes the magnetic layers 304, 306 to be magnetically anti-parallel coupled with one another. In addition, a hard magnetic bias structure 402 is provided at the back edge of the sensor layers (not shown in FIG. 3). The hard bias layer 402 has a magnetization perpendicular to the air bearing surface ABS, which is represented by arrow 404. The magnetic layers 304, 306 have a magnetic anisotropy that is parallel with the ABS, so that in the absence of a magnetic field 404 from the hard bias layer 402, the magnetizations of the layers 304, 306 would be oriented anti-parallel to one another in directions that are parallel with the ABS. However, the presence of the a bias field from the magnetization 404 of the bias layer 402 cants the magnetizations of the magnetic layers 304, 306 to a direction that is not parallel with the ABS. The direction of magnetizations of the magnetic layers 304, 306 are represented by arrows 406, 408, with the arrow 406 representing the direction of magnetization of the layer 304 and the arrow 408 representing the direction of magnetization of the layer 308. However, the magnetizations 406, 408, can move relative to one another in response to a magnetic field, such as from a magnetic media. This change in the directions of magnetizations 406, 408 relative to one another changes the electrical resistance across the barrier layer 308, and this change in resistance can be detected as a signal for reading magnetic data from a media such as the media 112 of FIG. 1.

In the above described example, the presence of the side magnetic shields 318, 320 (shown in FIG. 3) improves the reduction of and definition of the track width of the sensor. However, with reference again to FIG. 4, with this embodiment it is possible that the directions of the magnetizations 406, 408 can flip. This would result in the magnetic sensor being inoperable.

Figure 5:
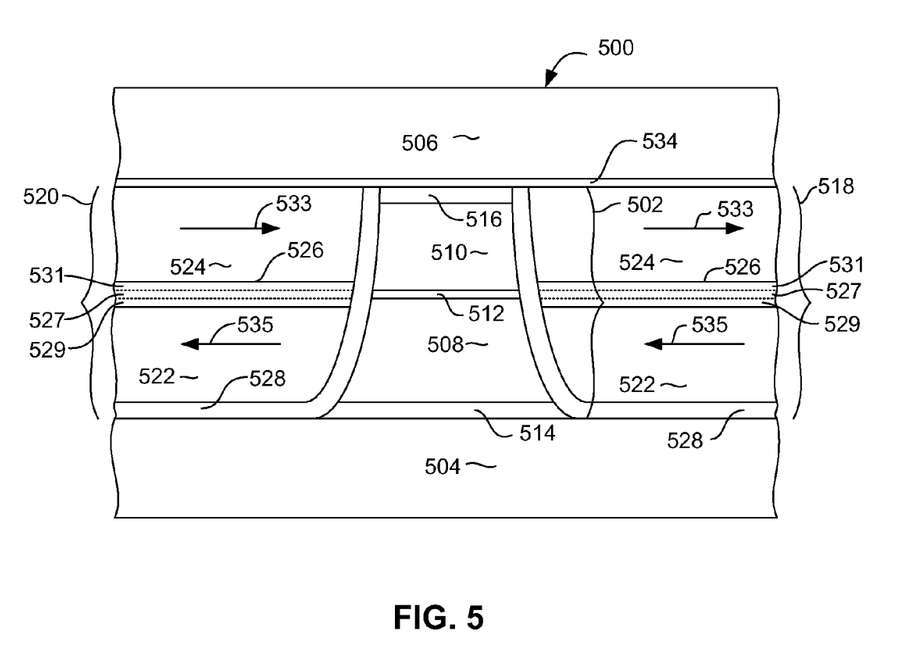
FIG. 5 is an air bearing surface view of a magnetic read element according to an embodiment of the invention.

FIG. 5 shows an air bearing surface view of a magnetic sensor according to an embodiment of the invention. A read element 500 includes a sensor stack 502 that is sandwiched between a lower or leading shield 504 and an upper or trailing shield 506. As with the previously described embodiment, the sensor stack 502 can include first and second free layers 508, 510 and a non-magnetic layer 512 sandwiched there-between that can be an electrically insulating barrier layer such as MgO or can be an electrically conductive spacer layer such as AgSn. A seed layer 514 can be provided at the bottom of the sensor stack 502 to promote a desired grain growth in the above layers of the sensor stack 502. A capping layer 516 can be provided at the top of the sensor stack 502.

The read head 500 includes anti-parallel coupled magnetic side shields 518, 520 that include first and second soft magnetic layers 522, 524 that are anti-parallel coupled across an anti-parallel exchange coupling layer 526. The soft magnetic layers 522, 524 can be constructed of a material such as Ni—Fe that has soft magnetic properties with low magnetic coercivity. The magnetic layers 522, 524 can each have saturation magnetizations (Bsat) that are the same as one another or different from one another and that can be high or low. The magnetic side shield structures 518, 520 are separated from the sensor stack 502 and from the bottom shield 504 by a layer of non-magnetic, electrically insulating material 528, which can be one or more of AlOx, MgO, SiN, TaOx or SiOxNy.

The upper or trailing magnetic shield 506 can be constructed of a soft magnetic material such as Ni—Fe. Because the trailing shield 506 is constructed of a soft magnetic material having a low coercivity such as Ni—Fe, it can function well as a magnetic shield. The trailing magnetic shield 506 is separated from the sensor stack 502 and from the side shields 518, 520 by a layer of non-magnetic material such as Ru 534 that is sufficiently thick that it breaks the exchange coupling between the trailing shield 506 and the magnetic layers 524.

The anti-parallel exchange coupling layer 526 is a multilayer structure that includes a layer of Ru 527 sandwiched between first and second layers of CoFe 529, 531. The anti-parallel exchange coupling layer structure 526 is exchange coupled with the adjacent magnetic layers 522, 524 and sets the magnetizations of these layers anti-parallel to one another as indicated by arrows 533, 535.

One or both of the magnetic layers 522, 524 can be constructed of multiple magnetic layers. Preferably these layers include: a layer of Ni—Fe having about 55 atomic percent Fe; a layer of Ni—Fe having about 20 atomic percent Fe; a layer of Ni—Fe having about 19 atomic percent Fe; a layer of Ni—Fe having about 12.5 atomic percent Fe; a layer of Ni—Fe having about 4 atomic percent Fe and a layer of Ni—Fe—Mo having about 17 atomic percent Fe and about 5 atomic percent Mo. In addition, one or more of the leading and trailing shields 504, 506 can be constructed of these materials. Use of this combination of materials provides improved magnetic stability.

Figure 6:
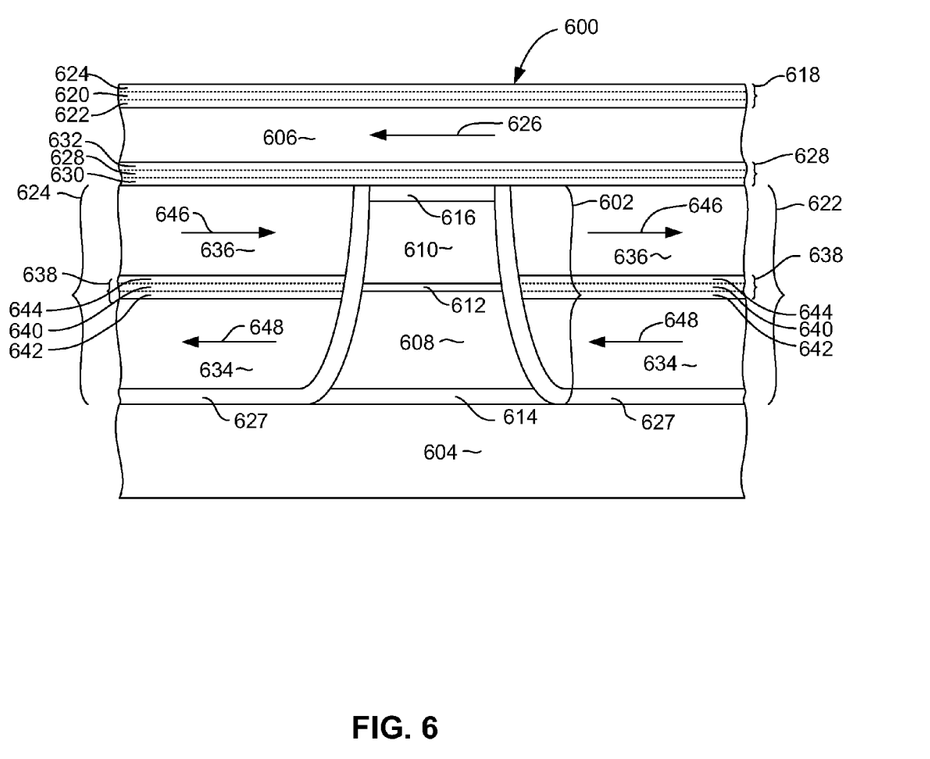
FIG. 6 is an air bearing surface view of a magnetic read element according to another embodiment of the invention.

With reference now to FIG. 6, a read sensor 600 according to another embodiment of the invention is described. Like the previously described embodiments, the read sensor 600 includes a sensor stack 602 that is sandwiched between first and second magnetic shields 604, 606. The first shield 604 is a bottom or leading shield, and the second shield 606 is an upper or trailing shield. Both the first and second shields 604, 606 can be constructed of a low magnetic coercivity, soft magnetic material such as NiFe. The sensor stack 602 can include first and second free magnetic layers 608, 610 with a non-magnetic antiparallel coupling layer such as Ru 612 sandwiched there-between. The sensor stack 602 can also include a seed layer 614 and a capping layer 616.

The second or trailing shield 606 is exchange coupled with an exchange coupling layer structure 618 that can include a layer of antiferromagnetic material such s Ir—Mn 620 sandwiched between first and second magnetic layers 622, 624 that are preferably Co—Fe. The exchange coupling layer structure 618 is exchange coupled with the trailing magnetic shield 606 and sets the magnetization of the magnetic layer in a direction parallel with the air bearing surface as indicated by arrow 626.

The read element 600 includes magnetic side shield structures 622, 624 that are separated from the sensor stack 602 and from the leading shield 604 by a layer of non-magnetic, electrically insulating material 627. The trailing magnetic shield 606 is separated from the side shields 622, 624 (and from the sensor stack 602) by a non-magnetic anti-parallel exchange coupling layer 628. The anti-parallel exchange coupling layer 628 can be constructed as a layer of Ru 628 sandwiched between first and second magnetic layers 630, 632, which are preferably Co—Fe.

Each of the side shield structures 622, 624 can include first and second magnetic layers 634, 636. The magnetic layers 634, 636 are anti-parallel coupled across another anti-parallel exchange coupling layer 638. The anti-parallel exchange coupling layer 638 can be constructed of a layer of Ru 640 sandwiched between first and second magnetic layers 642, 644 which are preferably Co—Fe.

The anti-parallel exchange coupling structure 628 sets the magnetization of the upper magnetic layer 636 in a direction that is opposite (e.g. anti-parallel with) the magnetization direction 626 of the trailing shield 606, as indicated by arrows 646. The anti-parallel exchange coupling layer 638 sets the magnetization of the lower magnetic layer 634 in a direction that is opposite to (anti-parallel to) the magnetization 646 of the upper magnetic layer 634 as indicated by arrow 648.

The magnetizations of the magnetic free layers 608, 610 are similar to that described above with reference to FIG. 4. Magnetic bias fields from the layers 634, 636 stabilize the magnetizations of the sensor layers 608, 610 in order to prevent flipping of the magnetization of these layers, thereby stabilizing the sensor 600 and making it more reliable.

Figure 7:
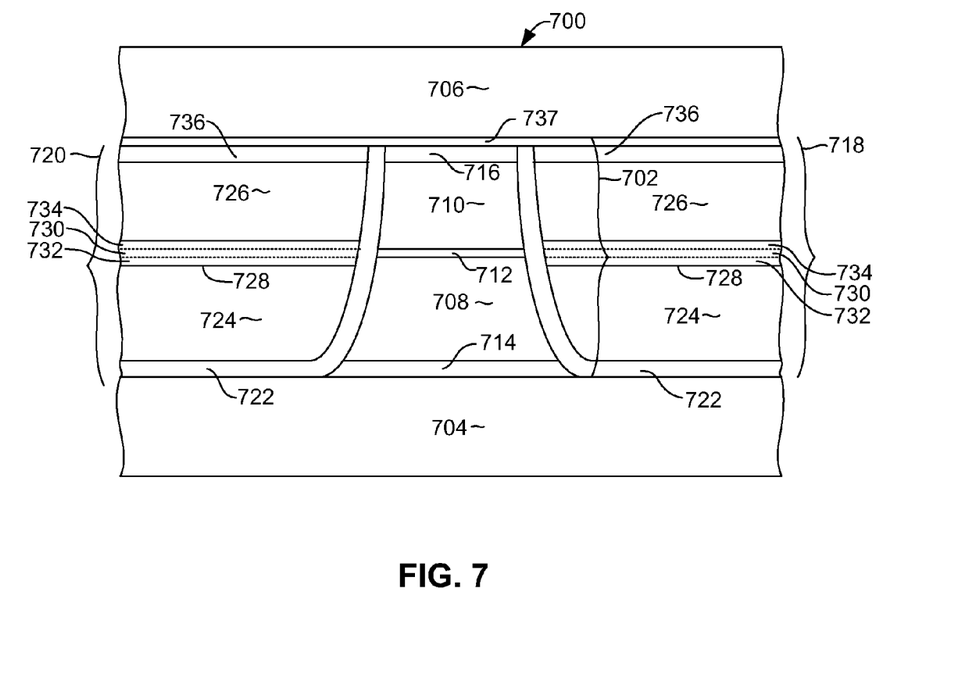
FIG. 7 is an air bearing surface view of a magnetic read sensor according to yet another embodiment of the invention.

With reference now to FIG. 7, another embodiment of the invention includes a magnetic read element 700 having a sensor stack 702 that is sandwiched between a leading magnetic shield 704 and a trailing magnetic shield 706. The sensor stack 702 includes first and second magnetic free layers 708, 710 that are anti-parallel coupled across a non-magnetic anti-parallel coupling layer such as alumina 712. The sensor stack can also include a seed layer structure 714 and a capping layer structure 716.

Side shield structures 718, 720 are provided at the sides of the sensor stack 702 and are separated from the sensor stack 702 and from the leading magnetic shield 704 by non-magnetic, electrically insulating insulation layers 722. Like the previously described embodiment, each of the side shield structures 718, 720 includes first and second magnetic layers 724, 726 that are anti-parallel coupled across an anti-parallel exchange coupling layer 728. The magnetic layers 724, 726 can be constructed of materials that have the same magnetic saturation (Bsat) as one another, or can be constructed of materials having different Bsat values. The anti-parallel exchange coupling layer 728 can be constructed of a layer of Ru 730 sandwiched between first and second magnetic layers 732, 734 that are preferably Co—Fe. The anti-parallel exchange coupling layer 728 is preferably of such as thickness as to anti-parallel couple the first and second magnetic layers 724, 726.

The upper or trailing-most magnetic layer 726 contacts and is exchange coupled with a layer of anti-ferromagnetic material 736, which is preferably Ir—Mn. The antiferromagnetic layer 736 in this embodiment is located at the top or trailing most edge of the magnetic layer 726, between the magnetic layer 726 and the trailing magnetic shield 706. The exchange coupling between the antiferromagnetic layer 736 and the magnetic layer 726 pins the magnetization of the magnetic layer 726 in a first direction parallel with the air bearing surface. The anti-parallel coupling between the magnetic layer 726 and magnetic layer 724 pins the magnetization of the magnetic layer 724 in a second direction that is also parallel with the ABS and which is opposite (anti-parallel) with the direction of magnetization of the layer 726.

A decoupling layer 737 separates the trailing magnetic shield from the anti-ferromagnetic layer side shields structures 718, 710 and sensor stack 702. The decoupling layer 737 is located at the leading most edge of the trailing magnetic shield 706. The decoupling layer 737 can be constructed of Ru and is sufficiently thick so as to magnetically decouple the trailing magnetic shield 706 from the antiferromagnetic layers 736 and side shield structures 718, 720.

Figure 8:
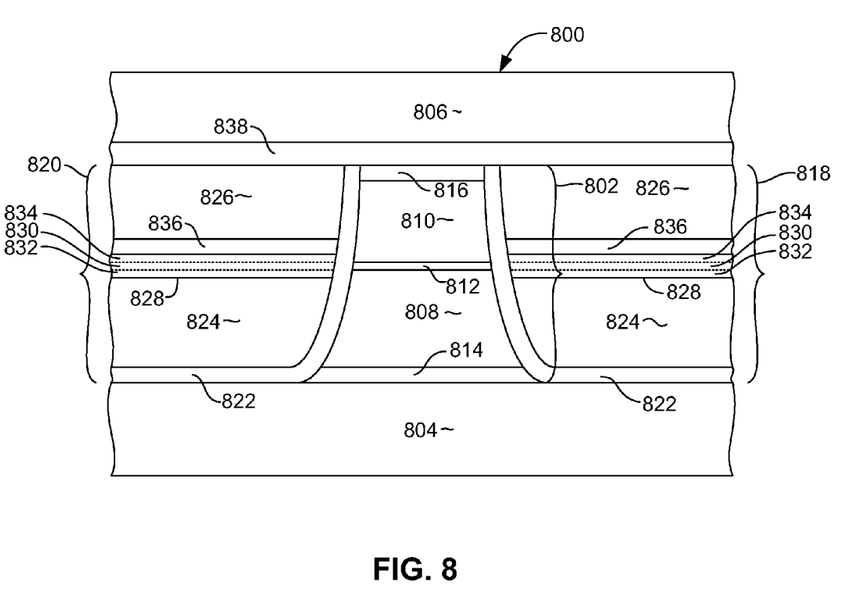
FIG. 8 is an air bearing surface view of a magnetic read sensor according to still another embodiment of the invention.

With reference now to FIG. 8, another embodiment of the invention provides a magnetic element 800 that includes a sensor stack 802 that is sandwiched between leading and trailing magnetic shields 804, 806. The sensor stack 802 includes first and second magnetic free layers 808, 810 that are separated by and anti-parallel coupled across a non-magnetic barrier layer 812. A seed layer 814 may be provided at the bottom of the sensor stack 802 and a capping layer 816 may be provided at the top of the sensor stack.

The read element includes first and second magnetic side shield structures 818, 820 formed at either side of the sensor stack 802. The side magnetic shield structures a 818, 820 are separated from the sensor stack 802 and from the leading shield 804 by non-magnetic, electrically insulating layers 822.

Each of the side shield structures can include first and second magnetic layers 824, 826. As with the previously described embodiments, the side shield structure includes an anti-parallel exchange coupling layer 828 that includes a layer of Ru 830 sandwiched between first and second magnetic layers 832, 834 that are preferably Co—Fe.

In this embodiment, a layer of anti-ferromagnetic material 836 is located at the bottom of the upper magnetic layer 826, between the exchange coupling layer 828 and the magnetic layer 826. This layer of anti-ferromagnetic material is preferably Ir—Mn and is exchange coupled with the upper or trailing-most magnetic layer 826 so that it pins the magnetization of the magnetic layer 826 in a first direction that is parallel with the air bearing surface. Anti-parallel coupling between the magnetic layer 826 and the magnetic layer 824 causes the magnetization of the lower magnetic layer 824 to be oriented in a second direction that is parallel with the air bearing surface and anti-parallel with the first direction (e.g. anti-parallel with the direction of magnetization of the magnetic layer 826).

With continued reference to FIG. 8, a decoupling layer 838 can be provided between the trailing magnetic shield 806 and the side shield structures 818, 820 and sensor stack 802. This decoupling layer 838 is a constructed of a non-magnetic material such as Ru and is sufficiently thick to magnetically decouple (e.g. break the exchange coupling between) the tailing magnetic shield 806 and the magnetic layer 826.

Figure 9:
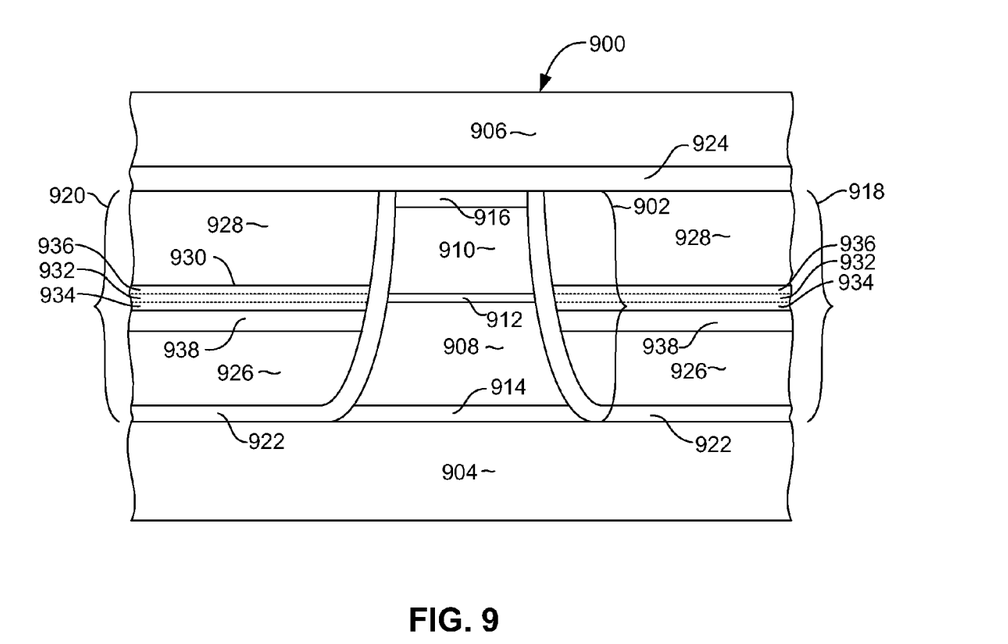
FIG. 9 is an air bearing surface view of a magnetic read sensor according to yet another embodiment of the invention.

With reference now to FIG. 9, still another embodiment of the invention is described. FIG. 9 shows a magnetic read element 900 having a sensor stack 902 that is sandwiched between a leading magnetic shield 904 and a trailing magnetic shield 906. The sensor stack 900 includes first and second magnetic layers 908, 910 and a non-magnetic barrier layer 912 sandwiched there-between. A seed layer 914 may be provided at the bottom of the sensor stack 902 and a capping layer 916 may be provided at the top of the sensor stack.

The read element 900 also includes magnetic side shields 918, 920 at either side of the sensor stack 902 that are separated from the sensor stack 902 and from the leading magnetic shield 904 by non-magnetic, electrically insulating layers 922. A non-magnetic de-coupling layer 924 is provided at the bottom of the trailing shield 906, separating the trailing shield 906 from the side shields 918, 920 and sensor stack 902. The de-coupling layer 924 can be constructed of Ru and is sufficiently thick to break exchange coupling between the trailing shield 906 and side shield structures 918, 920.

With continued reference to FIG. 9, the magnetic side shields include first and second magnetic layers 926, 928, and an anti-parallel exchange coupling layer 930 located between the magnetic layers 926, 928. As with the previously described embodiments, the exchange coupling layer can include a layer of Ru 932 sandwiched between first and second magnetic layers such as CoFe 934, 936.

In addition, a layer of antiferromagnetic material 938 is located between the antiparallel exchange coupling layer 930 and the bottom magnetic layer 926. The layer of antiferromagnetic material 938 is preferably IrMn and is exchange coupled with the lower magnetic layer 926 so as to pin the magnetization of the lower magnetic layer 926 in a first direction parallel with the air bearing surface. Anti-parallel coupling between the magnetic layers 926, 928 orients the magnetization of the upper magnetic layer 928 in a second direction that is anti-parallel to the first direction.

Figure 10:
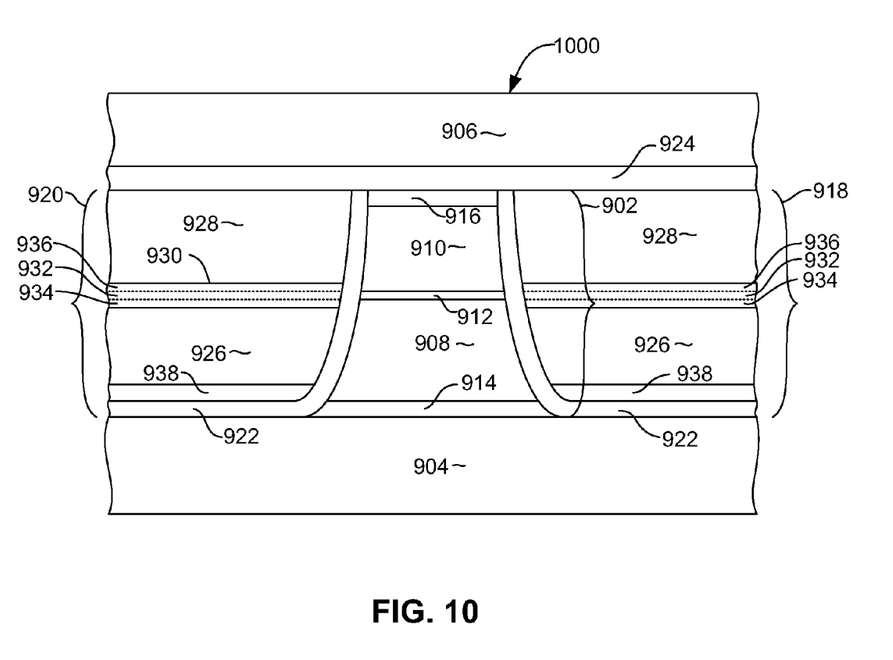
FIG. 10 is an air bearing surface view of a magnetic read sensor according to yet another embodiment of the invention.

FIG. 10 shows an air bearing surface view of another embodiment of the invention. FIG. 10 shows a magnetic read element 1000 that is similar to the sensor 900 described above with reference to FIG. 9. However, the read element 1000 has a layer of antiferromagnetic material 938 that is located at the bottom of the first magnetic layer 926 rather than at the top. The layer of antiferromagnetic material 938 is located between the first magnetic layer 926 and the insulation layer and leading shield 922, 904. As with the previously described embodiment, the layer 938 contacts and is exchange coupled with the first magnetic layer 926, and this exchange coupling pins the magnetization of the layer 926 in first direction parallel with the air bearing surface. Anti-parallel coupling between the first and second magnetic layers 926, 928 orients the magnetization of the second magnetic layer 928 in a second direction that is opposite to the first direction and which is also parallel with the air bearing surface.

Figure 11:
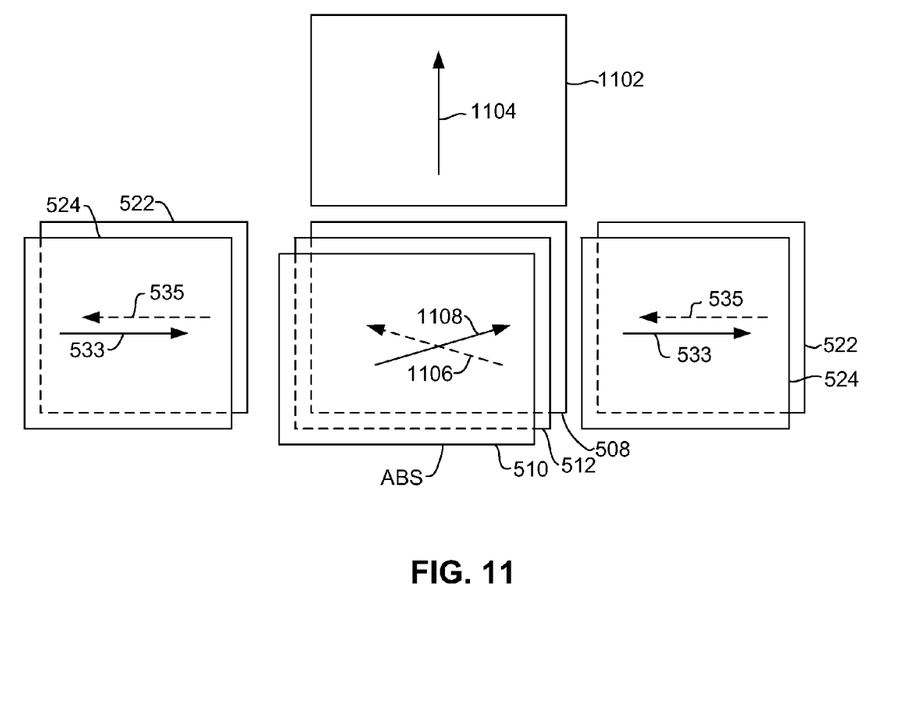
FIG. 11 is a top down, exploded, schematic view of a portion of a read sensor, illustrating magnetic biasing of a scissor type magnetic read sensor according to an embodiment of the invention.

With reference now to FIG. 11, the effects of the bias structures on the magnetic free layers of the various previously discussed embodiments can more clearly understood.

The top down exploded view shown in FIG. 10 will be discussed with reference to the structure described above with regard to FIG. 5. However, the magnetic biasing and stabilization describe in FIG. 11 applies to any of the structures described with regard to any of the FIGS. 6-10 as well.

FIG. 11 shows a top down, exploded, schematic view of the magnetic layers 508, 510 and barrier layer 512 described above with reference to FIG. 5. The edge denoted "ABS" indicates the location and orientation of the air bearing surface. A back edge hard bias structure 1102 (which was not shown in FIG. 5) is located at the back or stripe height edge of the layer (opposite the air bearing surface) and would be separated from the layers 508, 510, 512 by a non-magnetic, electrically insulating layer (not shown) in a manner similar to that by which the side shields 518, 520 are in FIG. 5.

The back edge hard bias structure 1102 has a magnetization that is oriented perpendicular to the air bearing surface as indicated by arrow 1104. The anti-parallel coupling of the layers 508, 510 across the barrier layer 512, as well as magnetic anisotropy of the layers 508, 510 would tend to align the magnetizations of the layers 508, 510 in opposite directions that are parallel with the air bearing surface. However, the magnetization 1104 of the hard bias structure 1102 results in a magnetic bias field oriented perpendicular to the air bearing surface that cants the magnetizations of the layers 508, 510 away from being parallel with the air bearing surface. These magnetizations of the layers 508, 510 are represented by arrows 1106, 1108, with arrow 1106 being the magnetization of the layer 508 and arrow 1108 representing the magnetization of the layer 510. The arrow 1106 is shown in dashed line to indicate that layer 508 is located beneath layers 510, 512 in FIG. 10.

As discussed above with reference to FIGS. 3 and 4, should the magnetizations flip direction, (e.g 1108 pointed to the left and 1106 pointed to the right) the sensor would become inoperable. This would be possible, because the magnetic anisotropy of the layers 508, 510 and back edge biasing from the magnetization 1104 of the back edge bias structure 1102 do not have provide a preference for a particular orientation of the layers 1106, 1108 either to the right or to the left.

However, side magnetic bias fields from the magnetic layers 522, 524 do prevent this flipping by providing side magnetic bias fields for each of the magnetic layers 508, 510. With reference to both FIGS. 5 and 10, it can be seen that the magnetic layer 522 has a magnetization 535 that is oriented in a first direction that is parallel with the ABS and that the magnetic layer 524 has a magnetization that is oriented in a second anti-parallel direction. It can also be seen that the magnetic layer 522 is aligned with the first magnetic layer 508 whereas the magnetic layer 524 is aligned with the second magnetic layer 510.

In FIG. 11, the magnetization 1106 of the magnetic layer 508 points to the left and the magnetization 1108 of the magnetic layer 510 points to the right. The bias layer 522 generates a magnetic bias field that pulls the magnetization 1106 further to the left, to stabilize the magnetization 1106 of the magnetic layer 508. Similarly, the magnetic bias layer 524 generates a magnetic bias field that pulls the magnetization 1108 further to the right to bias the magnetization 1108. This biasing from the layers 522, 524 ensures that the magnetization 1106, 1108 of the magnetic layers 508, 510 cannot possibly flip directions. Therefore, the biasing from the magnetic layers 522, 524 greatly improves the reliability of the sensor. It should be pointed out again that, while this discussion of the magnetic side biasing provided by the present invention has been discussed with reference to the embodiment of FIG. 5, this biasing applies to all of the embodiments including those described above with reference to FIGS. 6-9.

While various embodiments have been described above, it should be understood that they have been presented by way of example only and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A magnetic read sensor, comprising:
   a sensor stack that includes first and second magnetic free layers that are anti-parallel coupled across a non-magnetic layer sandwiched there-between;
   a magnetic side shield structure formed at a side of the sensor stack; and
   a non-magnetic, electrically insulating layer separating the magnetic side shield structure from the sensor stack;
   wherein:
   the magnetic side shield structure further comprises a first and second magnetic layers and an exchange coupling layer sandwiched between the first and second magnetic layers;
   the magnetic layers are anti-parallel coupled with one another across the exchange coupling layer;
   the first magnetic layer is laterally aligned with the first magnetic free layer of the sensor stack and provides a magnetic bias field in a first direction parallel with an air bearing surface; and
   the second magnetic layer is laterally aligned with the second magnetic free layer of the sensor stack and provides a magnetic bias field in a second direction that is opposite to the first direction.

2. The magnetic read sensor as in claim 1 further comprising, a hard bias structure located adjacent to a back edge of the sensor stack opposite the air bearing surface, the hard bias structure providing a magnetic bias field that is perpendicular to the air bearing surface.

3. The magnetic read sensor as in claim 1 wherein the sensor is a scissor type magnetic sensor.

4. The magnetic read sensor as in claim 1 wherein the exchange coupling layer comprises a non-magnetic layer sandwiched between first and second magnetic layers.

5. The magnetic read sensor as in claim 1 wherein the first and second magnetic layers of the magnetic side shield structure each comprise Ni—Fe.

6. The magnetic read sensor as in claim 1 wherein the exchange coupling layer comprises a layer of Ru sandwiched between first and second layers of Co—Fe.

7. The magnetic read sensor as in claim 1 wherein the exchange coupling layer comprises a layer of Ru sandwiched between first and second layers of Co—Fe and the first and second magnetic layers of the magnetic side shield structure each comprise Ni—Fe.

8. The magnetic read sensor as in claim 1 further comprising a layer of antiferromagnetic material that is exchange coupled with the first magnetic layer of the magnetic side shield structure, the exchange coupling between the layer of antiferromagnetic material resulting in a pinning of a magnetization of the first magnetic layer in the first direction parallel with the air bearing surface.

9. The magnetic read sensor as in claim 8 wherein the layer of antiferromagnetic material is between the first magnetic layer and the exchange coupling layer.

10. The magnetic read sensor as in claim 8 wherein the layer of antiferromagnetic material contacts the first magnetic layer at a location that is opposite the exchange coupling layer.

11. The magnetic read sensor as in claim 1 further comprising a layer of antiferromagnetic material that is exchange coupled with the second magnetic layer of the magnetic side shield structure, the exchange coupling between the layer of antiferromagnetic material resulting in a pinning of a magnetization of the second magnetic layer in the second direction.

12. The magnetic read sensor as in claim 11 wherein the layer of antiferromagnetic material is located between the second magnetic layer and the exchange coupling layer.

13. The magnetic read sensor as in claim 11 wherein the layer of antiferromagnetic material contacts the second magnetic layer at a location that is opposite the exchange coupling layer.

14. The magnetic read sensor as in claim 1 wherein the sensor stack is sandwiched between a leading magnetic shield and a trailing magnetic shield.

15. The magnetic read sensor as in claim 14 further comprising a non-magnetic decoupling layer between the trailing magnetic shield and the side shield structure, the non-magnetic decoupling layer being sufficiently thick so as to magnetically de-couple the trailing magnetic shield from the magnetic side shield structure.

16. The magnetic read sensor as in claim 1 further comprising:
   a trailing magnetic shield;
   a layer of antiferromagnetic material that is exchange coupled with the trailing magnetic shield; and
   a second exchange coupling layer located between the trailing magnetic shield and the side shield structure and being configured to anti-parallel couple the trailing magnetic shield with the second magnetic layer of the magnetic side shield structure.

17. The magnetic read sensor as in claim 1 wherein at least one of the magnetic layer of the side shield structure comprises:
   a layer of NiFe having about 55 atomic percent Fe:
   a layer of NiFe having about 20 atomic percent Fe;
   a layer of NiFe having about 19 atomic percent Fe;
   a layer of NiFe having about 12.5 atomic percent Fe;
   a layer of NiFe having about 4 atomic percent Fe; and
   a layer of Ni—Fe—Mo having about 17 atomic percent Fe and about 5 atomic percent Mo.

18. The magnetic read sensor as in claim 1 wherein the non-magnetic, electrically insulating layer separating the magnetic side shield structure from the sensor stack comprises one or more of AlOx, MgO, SiN, TaO and SiOxNy.

19. A magnetic read head, comprising:
   a trailing magnetic shield;
   a leading magnetic shield;
   a sensor stack that includes first and second magnetic free layers that are anti-parallel coupled across a non-magnetic layer sandwiched there-between, the sensor stack having first and second laterally opposed sides sandwiched between the leading magnetic shield and the trailing magnetic shield;
   first and second magnetic side shield structures adjacent to and separated from each of the first and second sides of the sensor stack by a non-magnetic, electrically insulating layer, each of the first and second magnetic side shield structures including a first magnetic layer, a second magnetic layer and an exchange coupling layer sandwiched between the first and second magnetic layer and configured to anti-parallel couple the first and second magnetic layers;
   an exchange coupling layer sandwiched between the trailing magnetic shield and each of the first and second magnetic side shield structures and configured to anti-parallel couple the trailing magnetic shield with the second magnetic layer of the magnetic side shield structure;
   wherein the first magnetic layer is laterally aligned with the first magnetic free layer of the sensor stack and provides a magnetic bias field in a first direction parallel with an air bearing surface; and
   the second magnetic layer is laterally aligned with the second magnetic free layer of the sensor stack and provides a magnetic bias field in a second direction that is opposite to the first direction; and
   a layer of anti-ferromagnetic material, exchange coupled with the trailing magnetic shield so as to pin a magnetization of the trailing magnetic shield in a direction parallel with an air bearing surface of the sensor stack.

20. The magnetic read head as in claim 19 wherein the layer of anti-ferromagnetic material contacts the trailing magnetic shield at a location that is opposite the magnetic side shield structure.

21. The magnetic read head as in claim 19 wherein the exchange coupling layer of the first and second magnetic side shield structures and the exchange coupling layer of located between the trailing magnetic shield and the magnetic side shield structures each comprise a layer of Ru sandwiched between first and second layers of Co—Fe.

22. The magnetic read head as in claim 19 wherein at least one of the leading and trailing magnetic shields comprises:
   a layer of NiFe having about 55 atomic percent Fe:
   a layer of NiFe having about 20 atomic percent Fe;
   a layer of NiFe having about 19 atomic percent Fe;
   a layer of NiFe having about 12.5 atomic percent Fe;
   a layer of NiFe having about 4 atomic percent Fe; and
   a layer of Ni—Fe—Mo having about 17 atomic percent Fe and about 5 atomic percent Mo.

23. A magnetic data recording system, comprising:
   a housing;
   a magnetic media mounted within the housing;
   a slider;
   an actuator mounted within the housing for moving the slider adjacent to the magnetic media;
   a magnetic read sensor formed on the slider, the magnetic read sensor further comprising:
   a sensor stack that includes first and second magnetic free layers that are anti-parallel coupled across a non-magnetic layer sandwiched there-between;
   a magnetic side shield structure formed at a side of the sensor stack; and
   a non-magnetic, electrically insulating layer separating the magnetic side shield structure from the sensor stack;
   wherein:
   the magnetic side shield structure further comprises a first and second magnetic layers and an exchange coupling layer sandwiched between the first and second magnetic layers;
   the magnetic layers are anti-parallel coupled with one another across the exchange coupling layer;
   the first magnetic layer is laterally aligned with the first magnetic free layer of the sensor stack and provides a magnetic bias field in a first direction parallel with an air bearing surface; and
   the second magnetic layer is laterally aligned with the second magnetic free layer of the sensor stack and provides a magnetic bias field in a second direction that is opposite to the first direction.

* * * * *